United States Patent

Ogawa

4,210,387
Jul. 1, 1980

[54] FOCUS DEVICE FOR ZOOM LENS

[75] Inventor: Ryota Ogawa, Kawagoe, Japan

[73] Assignee: Asahi Kogaku Kogyo Kabushiki Kaisha, Tokyo, Japan

[21] Appl. No.: 27,638

[22] Filed: Apr. 6, 1979

[30] Foreign Application Priority Data

Apr. 21, 1978 [JP] Japan .................................. 53/47474

[51] Int. Cl.² .......................... G02B 7/04; G02B 15/18
[52] U.S. Cl. ....................................... 350/187; 350/255
[58] Field of Search ........................ 350/187, 184, 255

[56] References Cited

U.S. PATENT DOCUMENTS

| | | | |
|---|---|---|---|
| 3,970,368 | 6/1976 | Von Belvard | 350/187 |
| 4,110,005 | 8/1978 | Bohm et al. | 350/187 |

FOREIGN PATENT DOCUMENTS

| | | | |
|---|---|---|---|
| 1169280 | 4/1964 | Fed. Rep. of Germany | 350/187 |
| 2338097 | 4/1974 | Fed. Rep. of Germany | 350/187 |
| 2364574 | 6/1975 | Fed. Rep. of Germany | 350/187 |
| 2555953 | 6/1977 | Fed. Rep. of Germany | 350/187 |
| 2715780 | 10/1977 | Fed. Rep. of Germany | 350/187 |

*Primary Examiner*—Jon W. Henry
*Attorney, Agent, or Firm*—Sughrue, Rothwell, Mion, Zinn and Macpeak

[57] ABSTRACT

A focus device for a zoom lens having a mounting barrel focus member and a variator member. A stopper defines a short distance limit stop position. The stopper moves in cooperation with the variator member so that in a particular range of a focal distance of the zoom lens, the short distance photographing limit is advanced to allow extreme close-up photography.

5 Claims, 6 Drawing Figures

FOCUS DEVICE FOR ZOOM LENS

BACKGROUND OF THE INVENTION

The present invention relates to a focus device for a zoom lenses, having coverage in a range from an ordinary photographing lens to that of close-up photographing.

Recently, there has been provided a so-called macro zoom lens or close focussing zoom lens which is employed for close-up photographing over a range beyond that of ordinary photographing. Many methods therefor have been practically used.

The first method is that an additional close-up lens is disposed at either end of the zoom lens system or in the middle of the zoom lens system. The second method is that a part of a variating lens system of the zoom lens system is moved. The third method is that a focussing lens of the zoom lens system is moved. The fourth method is that the overall zoom lens system is moved.

The first method has the following defects.

1. Because of the addition of the new optical system, the number of lens elements in the construction of the zoom lens is increased to thereby deteriorate the transmission factors such as inner reflection and the like.
2. When a close-up lens is used as a lens attachment, an operation to mount it to a lens mount barrel of the zoom lens is required, hence the operationability is deteriorated. Also, since the close-up lens is a separate component there is a possibility that it will be lost.
3. In case where the close-up lens is mounted inside of the zoom lens mount barrel, during the ordinary photographing, it is necessary that the close-up lens be displaced or offset from the optical path. For this reason, the size of the zoom lens barrel is enlarged.
4. A close-up or short distance scale must be added on an ordinary distance scale so the scale display is more complicated.

The second method has the following defects.

1. The moving amount of a part of the variator lens system is varied according to the focal distance. It is, therefore, very difficult to display the short distance scale or the construction of the scale becomes rather complicated.
2. Ordinary operational members for focussing and operational members for short distance focussing are independent elements. Accordingly, the handling or operation thereof is complicated and at the same time, means for distinguishing the variator operation from the short distance focussing operation is required.

The third and fourth methods have the following defects.

1. A focus lens system which is not generally movable is moved during short distance photographing. Therefore, the reproducibility of the positional relation thereof deteriorates.
2. Since the advancing amount is varied according to the focal length, the scale display is complicated.

SUMMARY OF THE INVENTION

In order to overcome the above-noted defects inherent to the conventional macro zoom lens, the present invention provides a focus device to enable to short distance photographing by operating an ordinary focussing member at a particular focal distance. In essence, a stopper member, on the short distance side, which defines an operational limit of a focussing member on the short distance side, is supported fixedly to a variator operation member. Therefore, at a particular focal distance, the operational limit position of the focussing member on the short distance side is further rotated in the short distance direction. The focussing operational members can be operated to further reach the short distance side.

In general, in zoom lenses, a height of incidental light to the lens system is often varied according to a difference of the focal distance thereof. For example, the height of the incidental light (designated by solid lines in FIGS. 1a and 1b) at focal distance $f_{II}$ is lower than that at focal distance $f_I$, and the forward moving length can be elongated as illustrated by the dotted line in FIG. 1b. On the other hand the various factors, such as distances between the adjacent lenses, lens thickness, curvatures and optical glass are easily determined in the design of the lens. The advancing amount can be increased in a particular range of a focal distance. A zoom lens system has the features as mentioned above. However, in a conventional zoom lens barrel, the moving amount at any focal distance is limited to a small constant value. Though the moving amount can be increased at a particular focal distance, this is neglected in lens design criteria.

The present invention is established on the basis of the optical properties of zoom lenses as described above. The structural feature of the lens barrel of the present invention will now be described in detail in reference to the accompanying drawings.

DESCRIPTION OF THE PREFERRED EMBODIMENT

Figure 1A:
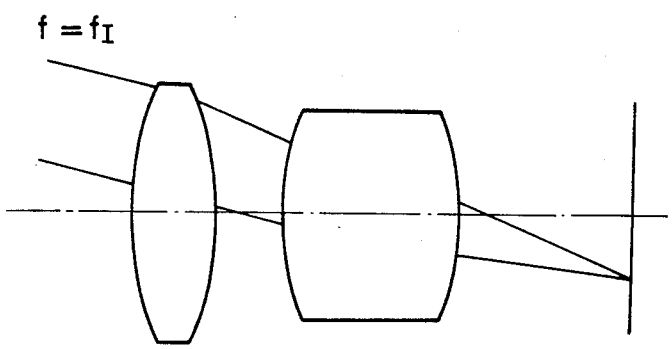
FIGS. 1a and 1b are illustrations of the advancing amount of zoom lenses and luminous flux.
Figure 1B:
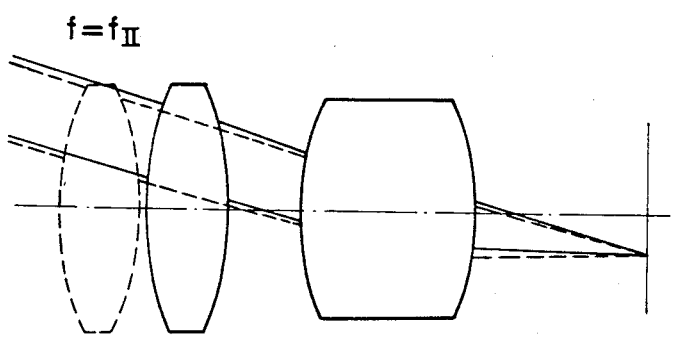
Figure 2:
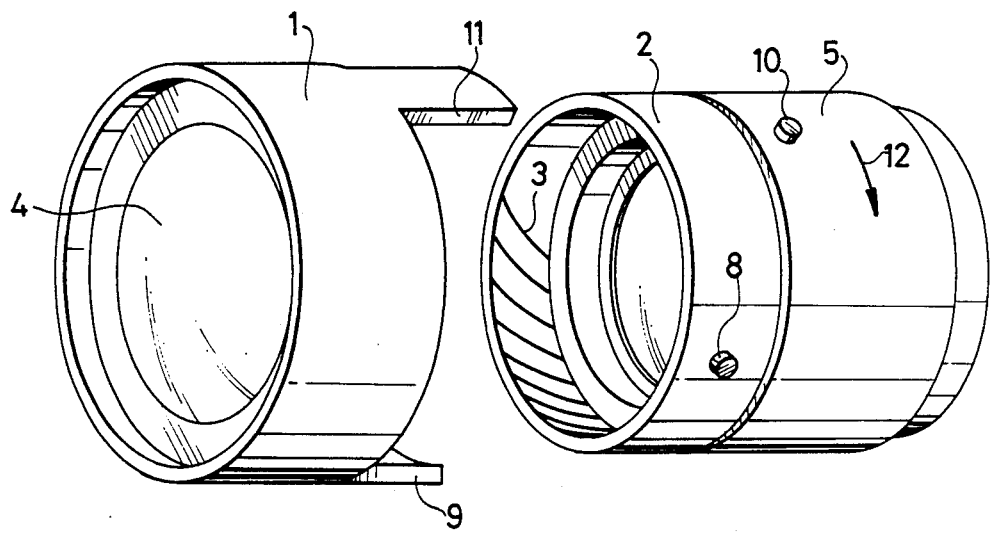
FIG. 2 shows a perspective view of a primary lens of the present invention.
Figure 3:
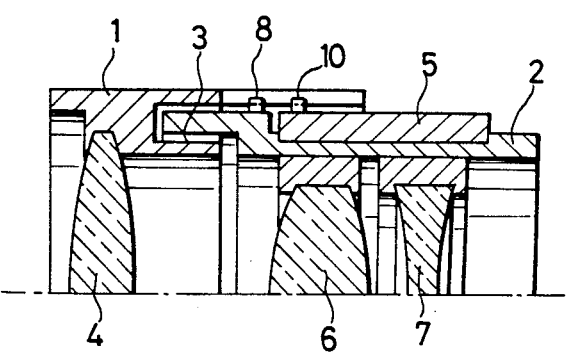
FIG. 3 shows a side view of the part shown in FIG. 2.

FIG. 2 is a perspective view of a primary part of one embodiment according to the present invention. FIG. 3 is a side view of the embodiment shown in FIG. 2. In FIGS. 2 and 3, the same members are designated by the same numbers. Reference numeral 1 designates a focussing member threadedly engaged by a helicoid 3 with a stationary lens barrel 2 fixed to a camera. A focussing lens 4 is secured to the focussing member 1. By the rotation of the focussing member 1 the focussing lens 4 is moved forwardly and backwardly to thereby achieve the ordinary focussing. A variator sleeve member 5 is rotatably engaged into the stationary lens barrel 2.

When the variator sleeve member 5 is operated to rotate, variator lenses 6 and 7 are moved with a predetermined interval therebetween to thereby achieve the variation of the zoom lens system. The cooperating mechanism between the variator member 5 and variator lenses 6 and 7 can be realized by conventional means such as a cam and a roller. This mechanism does not directly relate to the subject matter of the present invention. Therefore, the illustration and description therefor are omitted. Reference numeral 8 designates an infinite object side stopper member secured to the stationary lens barrel 2, abutting a cutaway end 9 of the focussing member 1 when the focussing lens 4 is at the infinite position. This stopper is used to define the operational limit position on the infinite object side. Reference numeral 10 designates a short distance side stopper member secured to the variator sleeve member 5, abutting a cutaway end 11 opposite to the end 9 of the focussing member 1 and defining the operational limit position on the short distance side.

The construction of the lens barrel of the present invention is as described above. When the variator sleeve member 5 is rotated in the direction shown by arrow 12, the above described stopper 10 is rotated integrally with the variator sleeve member 5. At particular focal distances, the operational limit position of the focussing member 1 can be further extended. At this point, it is also possible to further advance the focussing member 1 in the short distance direction. Therefore, if the variation condition due to the variator sleeve member 5 is appropriately established, the operational limit position of the focussing member 1 on the short distance side can extend to the further short distance position.

Figure 4:
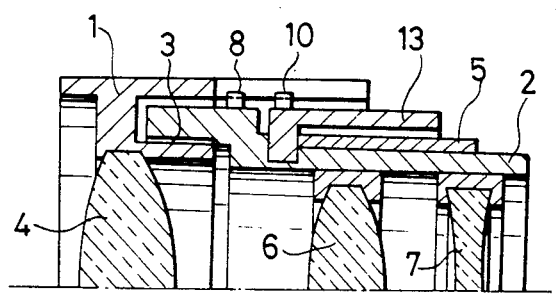
FIG. 4 is a sectional view of a primary part of another embodiment according to the present invention.
Figure 5:
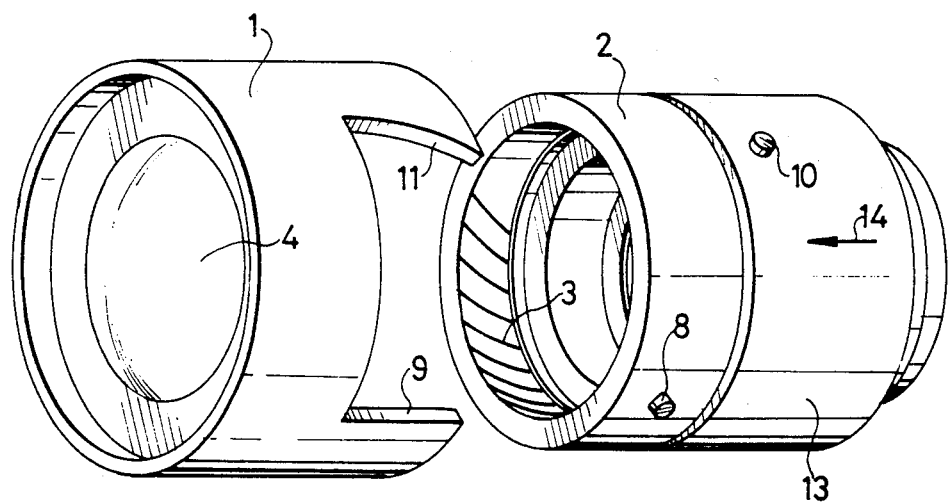
FIG. 5 is a perspective view of the lens shown in FIG. 4.

FIGS. 4 and 5 show another embodiment according to the present invention. In FIG. 4, a stopper ring 13 rotatably supported around an outer periphery of a stationary lens barrel 2 is rotated corresponding to the fore and aft movement of a variator sleeve 5. A focussing device is constructed so that the operational limit position of a focussing member 1 on the short distance side can be extended to a short distance side stopper member 10 secured to the stopper ring 13. In FIG. 5, a wall 11 of the focussing member 1 is machined into a suitable shape to provide corresponding rotational movement. When the variator member 5 is moved forwardly in the direction designated by arrow 14, at respective focal distances, the operational limit position of the focussing member 1 on the short distance side is extended and further movement of the focussing member in the short distance direction can be obtained. In FIG. 4, the cooperating rotation mechanism of the stopper ring 13 in compliance with the movement of the variator sleeve member 5 can be, of course, achieved by a conventional cam and roller mechanism.

As mentioned above, the present invention provides a lens barrel which is simple in a construction and easy to handle, enabling use of a zoom lens for photography at short distances.

It is apparent that other modifications can be made without departing from the scope of this invention.

What is claimed is:

1. In a focussing device for a zoom lens including a lens mount barrel, a focussing member, a variator member, and a stopper defining a short distance photographing limit for said focussing member, the improvement comprising; means for moving said stopper in cooperation with said variator member, whereby in a particular range of a focal distance of the zoom lens said short distance photographing limit is advanced in the extreme short distance photographing direction to facilitate extreme close-up photographing with said zoom lens.

2. A focussing device as defined in claim 1, wherein said means for moving comprises securing said stopper on said variator member.

3. A focussing device as defined in claim 1, wherein said means for moving comprises securing said stopper on a variator ring rotatably surrounding said variator member.

4. A focussing device as in claim 3 wherein said variator ring is positioned on said lens mount barrel for rotation with said variator member.

5. A focussing device as claimed in claims 1, 2 or 3 wherein said focussing member comprises a focus lens, a focus lens mount coaxial with said lens barrel mount and overlapping it to engage said stopper, and a cam surface defining the axial extension of said focus lens mount relative to said stopper.

* * * * *